(12) United States Patent
Stratton, Jr.

(10) Patent No.: US 6,357,937 B1
(45) Date of Patent: Mar. 19, 2002

(54) VIDEO COUPLER

(76) Inventor: James A. Stratton, Jr., 103 W. Marley La., Simpsonville, SC (US) 29681

( * ) Notice: Subject to any disclaimer, the term of this patent is extended or adjusted under 35 U.S.C. 154(b) by 0 days.

(21) Appl. No.: 09/538,545

(22) Filed: Mar. 30, 2000

Related U.S. Application Data
(60) Provisional application No. 60/127,134, filed on Mar. 31, 1999.

(51) Int. Cl.[7] ........................... G03B 21/36; G03B 17/00
(52) U.S. Cl. ....................................... 396/428; 396/432
(58) Field of Search ................................ 396/428, 429, 396/432

(56) References Cited

U.S. PATENT DOCUMENTS
5,053,794 A  10/1991  Benz ........................... 354/79

OTHER PUBLICATIONS

Internet web page http://www.geocities.com/gerryf.geo/questar.html, Gerry Foley, Sep. 23, 1999.*
Losmandy Astronomical Products Dovetail Systems, p 1–7 from www.losmandy.com.
Meade Instruments Co. Adaptors for LX—Series Telescopes p 1–2 from www.meade.com.
Celestron Photo Accessories, p 1–8, from www.celestron.com.
LE Adatpr from www.stillwtr.com.

* cited by examiner

Primary Examiner—David M. Gray
(74) Attorney, Agent, or Firm—J. Herbert O'Toole; Nexsen Pruet Jacobs & Pollard, LLC

(57) ABSTRACT

A means for attaching a camcorder to a telescope which allows the camcorder to be moved with the telescope to follow celestial bodies and record events such as eclipses. The means provides a rigid mounting bar, an adjustable sliding connector mounted on the bar, a bracket to align a camcorder at an angle to the optical tube and an adjustment rail attached to the bracket. The adjustment rail allows the camcorder to be aligned with the eyepiece of the telescope and to be withdrawn to change the eyepiece without altering the alignment of the camcorder and eyepiece.

10 Claims, 3 Drawing Sheets

VIDEO COUPLER

This Appln. claims benefit of Prov. No. 60/127,134 filed Mar. 31, 1999.

BACKGROUND OF THE INVENTION

1. Field of the Invention

This invention relates to methods and apparatus to connect cameras and camcorders to telescopes.

2. Description of the Prior Art

The amateur astronomer frequently desires to record his observations. In some cases he may wish to make a photograph in parallel with a telescope and wishes to align his camera accurately on the telescope. This may be done using various piggyback mounts which accurately affix a camera such as a 35 mm single lense reflex camera or, more recently, a digital camera of approximately the same size and weight. Other astronomers prefer to record an image through the tube of a telescope. Using arrangements originally developed for optical microscopy, it is possible to mount the body of a camera onto the telescope. This method requires modification of the telescope to mate with the particular design of the camera, which typically has a proprietary bayonette-type mount. Such a system is not interchangeable between camera designs and requires a typical amateur astronomer to constantly mount and remount his camera when changing lenses.

U.S. Pat. No. 5,053,794 to Benz discloses an universal adapter for attaching a camera to a telescope or microscope. The adapter consists of a ring sized to the front end cap of a camera, a deformable spring-steel band within the ring and adjustment screws (typically 3 in number) for tightening the adapter to the lense cap. The coupler ring is threaded into the adapter if needed to adjust the size of the opening. The Benz device has been adapted for camcorders and digital cameras as well.

Manufacturers of various amateur astronomy telescopes provide a modification of the Benz adapter commonly known as a T-adapter.

Camera mounts of this type are feasible because the cameras are not bulky and not particularly heavy. Counter weights are commonly used on mounts for telescopes, especially the epitorial mount frequently used with catadioptric telescopes and can be supplemented to balance the weight of the camera. A limitation sometimes arises when shooting substantially vertically because of the length of the camera adapter.

Camcorders present a different problem. Camcorders are heavier than 35 mm cameras and also are bulkier. For purposes of this invention, a camcorder is considered to be any device for recording visual images in a timed sequence. A means is needed to securely mount a camcorder to a telescope lense whereby the camcorder is not a significant extension of the length of telescope tube. It is likewise necessary to be able to accurately move the camcorder toward and away from an eyepiece both for focusing and so that different eye pieces can be used or that a Barlow lense can be added. Adjustment fore and aft on the optical tube is required when visual backs are modified. Adjustment also is required so that different brands of commercial camcorders may be substituted at little or no expense.

BRIEF SUMMARY OF THE INVENTION

It is an objective of this invention to provide a means for mounting a camcorder or a camera on a telescope for recording of celestial events.

It is a further objective of this invention to provide a method for mounting a camcorder or a camera to a telescope in way so that eyepieces and/or visual backs may be changed without disconnected the camcorder from the optical tube.

It is a further objective of this invention to provide a method for mounting different designs of camcorders without changing the mounting on the telescope tube.

It is an objective of this invention to provide a device to mount a camcorder or camera on a telescope tube.

These and other objectives may be achieved by providing means for connecting a camcorder to an optical tube in a fashion whereby a camcorder may be raised or lowered over the eyepiece of a telescope and adjusted fore and aft to compensate for different eyepieces.

DETAILED DESCRIPTION OF THE INVENTION

Due to the rotation of the earth and the movement of celestial bodies relative to the earth and to themselves, the observation of celestial bodies requires that the telescope be moved during observation. To maintain proper orientation of a camcorder attached to a telescope, it must move together with the telescope as of one piece. When firmly mounted in this way, it is possible to maintain a fix on a planet, moon or star for an extended period of time using a mechanical drive system and computerized controllers. Properly done, this means that it is possible to record events such as the passage of a meteor across a planet or moon and, with appropriate time signals recorded on a tape, to accurately time an entire event from beginning to end. The method of observation is especially preferred for observing planetary occultations. Powered systems enabling such tracking must be sturdy and smooth and the telescope must be balanced on the mount to prevent binding or undue wear on the drive. Light weight in the mounting components and a mounting system which locates the camera as close as possible to the center of gravity of the telescope as possible are of value.

Figure 1:
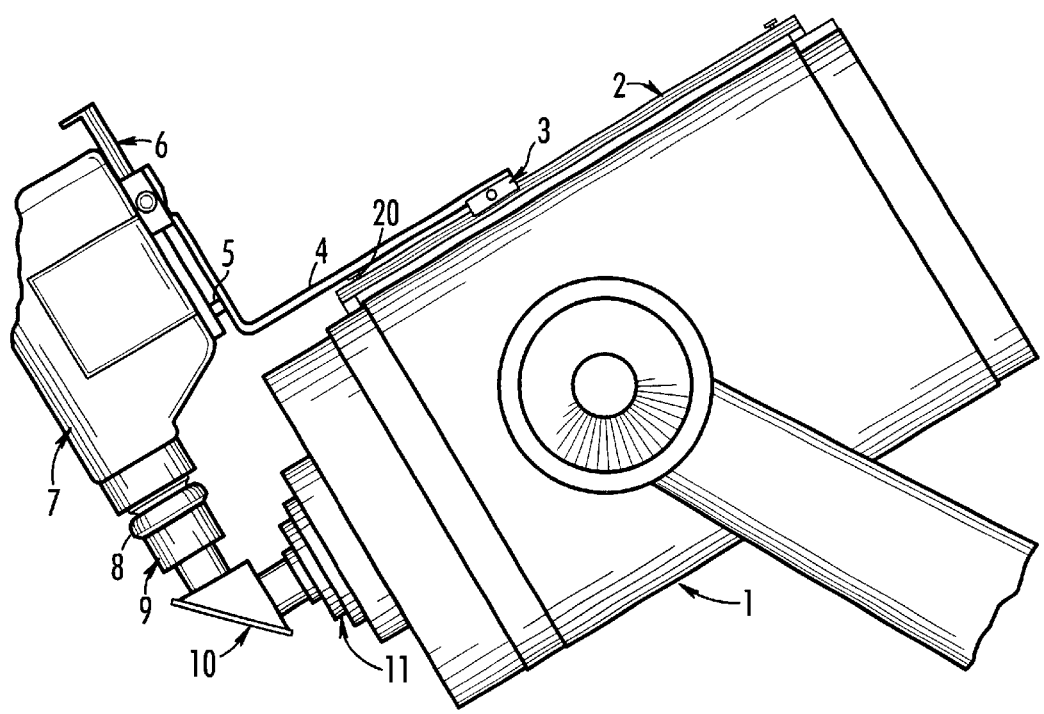
FIG. 1 shows a camcorder mounted on a telescope in a configuration for use.
Figure 2:
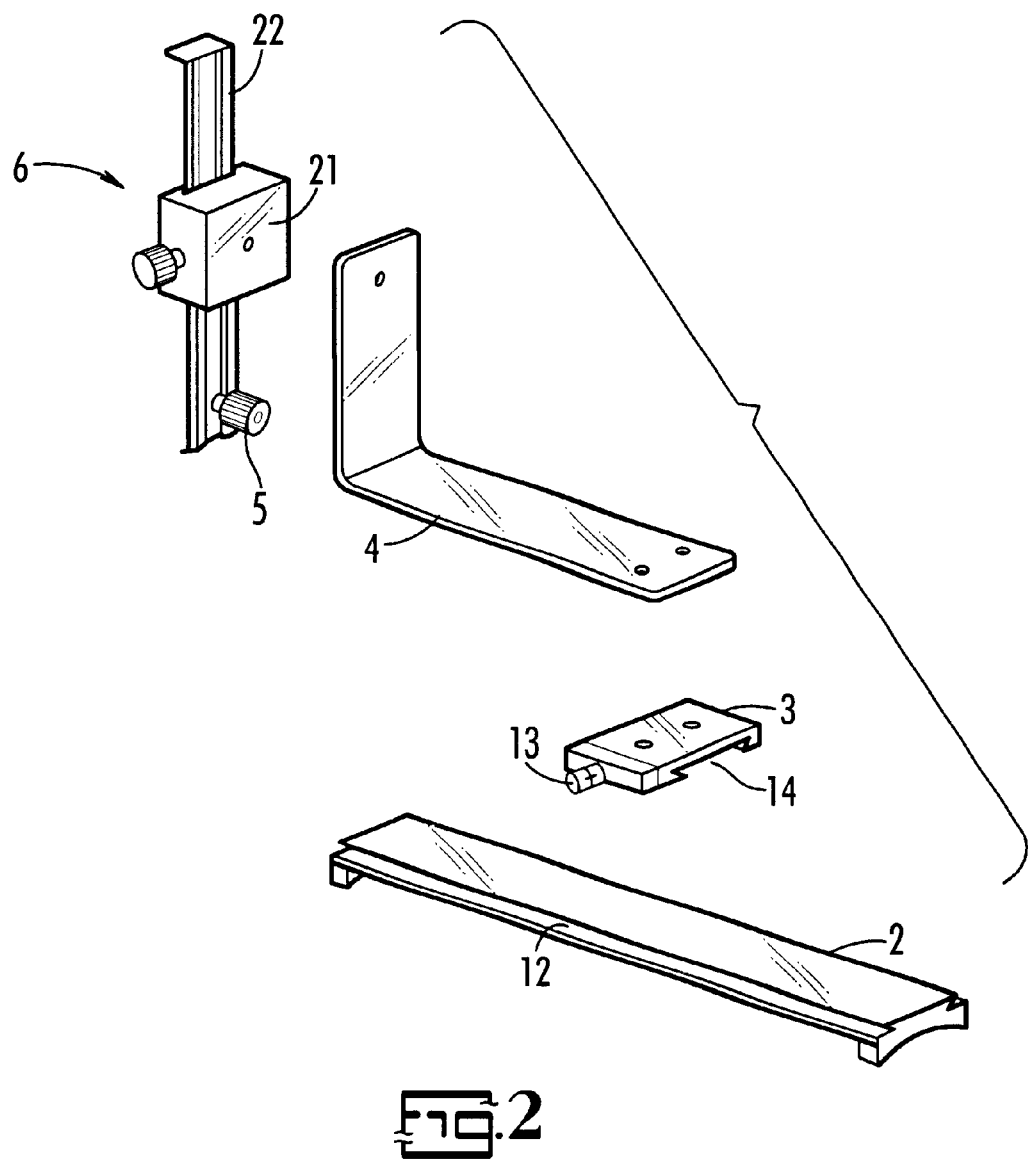
FIG. 2 is an exploded view of the components of a mounting system.

FIG. 1 illustrates a camcorder mounted on a catadioptric telescope which may be Schmidt-Cassegrain or Maksutov-Cassegrain design. Preferably, the telescopes have aperture sizes of 7" to 16", but size is not critical. Optical tube 1 is shown with a telescope diagonal 10 and eyepiece 9 mounted on the visual back 11. A bar 2 is mounted to an external surface of the optical tube and provides a means for anchoring the components of the camcorder mount system to optical tube 1. This means may be any rigid device which may be secured to the optical tube. Preferably it is screwed into existing tapped holes which are usually present in commercial telescopes but the method of mounting is not critical provided that result is a rigid mount parallel with the axis of the optical tube.

Bar 2 is not specifically limited as to shape but should include a provision for a slidable attachment 3. For stability, it is preferred that bar 2 of a width sufficient to allow it to be mounted without flex or wobble so that it may control side-to-side-movement of a camcorder as the telescope is moved. In consideration of weight, a light alloy is preferred and some coating is desirable to prevent corrosion. Anodized aluminium is a suitable material. Preferably, a dovetail bar is used having grooves 12 formed in each lateral side. I-beans of sufficient width are also useful.

Sliding means 3 is provided with means for slidably engaging bar 2 and for receiving mounting means 4. Sliding means 3 is provided with a means for locking onto tube bar 2 and is provided with means for attaching bracket 4 in a rigid manner.

Sliding means 3 may engage bar 2 using talons 14 slid in the recesses 12 in a dovetail bar when a dovetail bar is used as element 2. A locking screw 13 may be used to hold adapter means 3 in place on the dovetail bar. Slide means may also be moved by means of a pinion wheel engaging a rack formed in the top of the dovetail bar or adjusted by means of a screw passing through the length of groove formed in the top of the bar 2 and which engages a gimbaled nut in sliding means 3. Various other methods of accurate and smooth sliding movement locking means such as cam-locks may be employed as desired.

Bracket 4 mounts rigidly in sliding means 3. It may be unitary with sliding means 3 but is preferably detachable as by simple bolts holding bracket 4 into tapped holes in sliding means 3. Bracket means 4 is bent to allow alignment of camcorder 7 with telescope eyepiece 9. Commercial catadioptic telescopes are normally provided with a diagonal 10 so that the user may view objects which are directly overhead. Most camcorders have a mounting device in the base with an axis parallel with the axis of the lense of the camcorder. In most configurations of a camcorder and eyepiece, bracket 4 will bend at 90 degrees as shown in the figures. The angle would be different if adapted to a 45 degree eyepiece or for a camcorder having a non-traditional design.

Bracket 4 is capable of maintaining camcorder 7 at the selected angle relative to bar 2. For this reason, the second means for supporting bracket 4 in bar 2 would be required. This may be in the form of a fixed or adjustable support 20 which may be on the surface of bar 2 in the form of an adjustable bolt secured into bar 2. Alternatively, it may constitute a fixed protrusion from bracket means 4 or an adjustable bolt means. Alternatively, a second slide adapter means may be employed with or without a method for locking. Regardless of the means chosen, it is necessary to arrest all three degrees of freedom when the camcorder is in use.

Affixed to bracket 4 is the adjustment rail means 6. Adjustment rail means 6 is attached to bracket 4 through mounting bracket 21 which is securely attached to bracket 4. Rail means 22 is engaged to mounting bracket 21 so that the rail may be caused to move parallel to the axis of eyepiece 9. The same design considerations which apply to slide adapter 3 apply to mounting bracket 6. A rack and pinion motion system is preferred for smoothness of operation and is easily preloaded so as to bear at least the weight of a camcorder.

Commercial camcorders normally have a single mounting bolt in the base which may be used to mount on adjustable rail 22, in which case bolt 5 is used to secure the camera. Alternative mounting means which effect the same result are equally applicable.

Telescope eyepieces are available in several diameters but commercially available telescopes are typically 1.25 in. I.D. and, including a flexible rubber light shield, approximately 1 7/8 inches or 38 mm O.D. Camcorder lenses are approximately 50 mm ID. There exists, therefore, a need to fill the space and exclude light without interfering with the alignment of the optics. There is an additional need to isolate vibration between the camcorder and the eyepiece. A resilient ring 8, preferably formed from a foam-type rubber and colored black, has been found suitable. The connector is appropriately placed over the exposed end of the eyepiece to receive the camcorder lense, as shown in FIG. 1. The arrangement of camcorder and telescope does not require the use of an eyepiece and wider angle prime focus recording may be made when desired.

When an astronomer desires to observe a celestial event and to record the event, it is necessary merely to mount to the video coupler of this invention on a Cassegrain telescope, attach the camcorder to the device and adjust the alignment fore and aft on the telescope. The telescope may be sighted with the camcorder not attached or may be sighted through the camcorder, depending upon design of the camcorder. If it is desired, to change magnification, such as by the use of a Barlow lens, it is merely necessary to raise the camcorder using the adjustment rail, change lens, and lower the camcorder to the appropriate height. No realignment is necessary for this operation. In the event that it is found desirable to change the length between diagonal 10 and the visual back of the optical tube, change can be accommodated by moving the camcorder fore or aft the optical tube by sliding adapter 3.

The invention has been disclosed in terms of the use of a commercial camcorder. The device is likewise useful for taking pictures with a digital 35 mm camera. The video coupler may also be used to adjustably mount a pair of sighting binoculars or to attach other devices as may be desired.

The video coupler of this invention has been described in terms of its use on a catadioptric telescope. This utility is not limited to such a telescope and it may be applied equally as well to a Dobsonion or Newtonian telescope as well.

Figure 3:
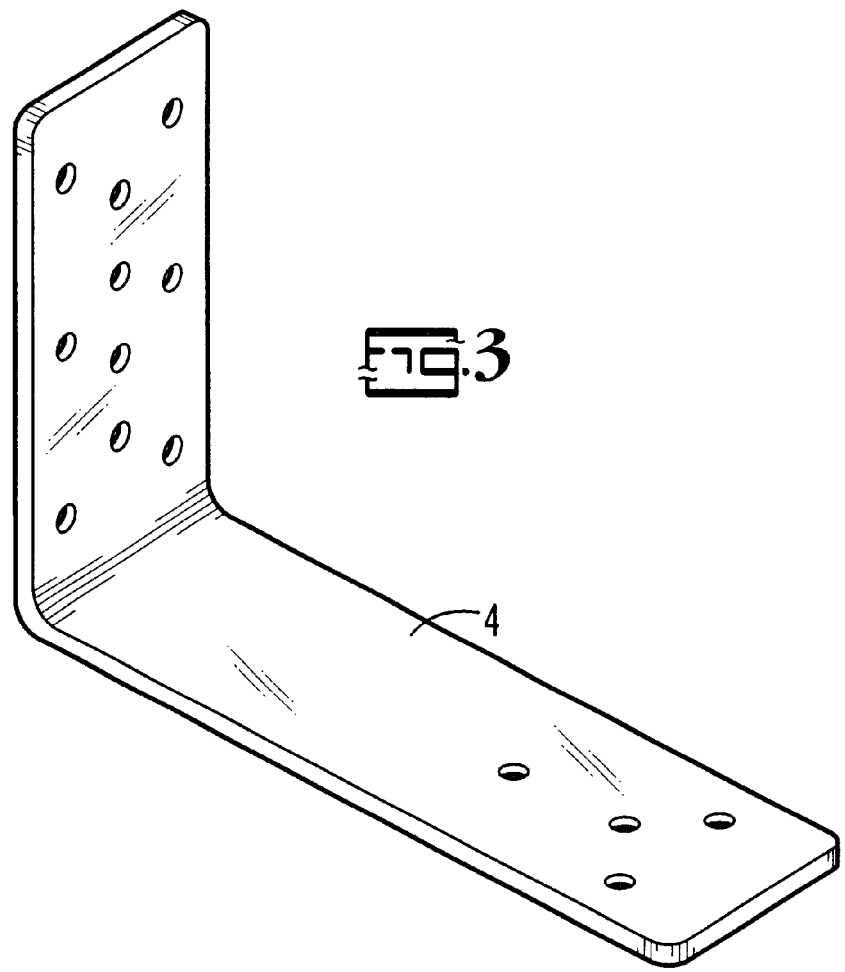
FIG. 3 shows the bracket required to connect components.
Figure 4:
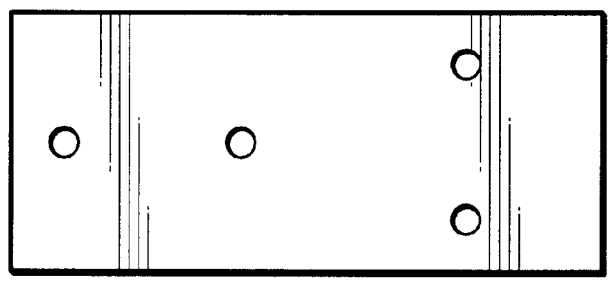
FIG. 4 shows an adapter plate to allow the use of cameras having non-standard mounts.

As shown in FIG. 3, bracket 4 is preferably drilled and tapped to receive a variety of mounting brackets. The apparatus is easily modified to accept different camcorders or other attachments. For example, FIG. 4 shows an adaptor which may be bolted to bracket 4 to mount a camcorder having a different (non-standard) offset of the mounting hole relative to the axis of the lens.

The invention has been described in terms of specific embodiments. Modifications and substitutions are apparent to those skilled in this art are within the per view and scope of this disclosure.

What is claimed is:

1. A means for attaching a camcorder to a telescope comprising:

rigid means attached to the optical tube of the telescope;

slidable means affixed on said rigid means;

a bracket affixed to said slidable means, said bracket having surfaces in at least two different planes;

adjustment rail means attached to said bracket; and means for attaching a camcorder to said adjustment rail means.

2. A means for attaching a camcorder to a telescope according to claim 1 wherein said rigid means attached to the optical tube of a telescope is a dovetail bar.

3. A means for attaching a camcorder to a telescope according to claim 1 wherein said slidable means further comprises a set screw to lock said slidable means in place on said rigid means.

4. A means for attaching a camcorder to a telescope according to claim 1 wherein said bracket means is formed to include an angle.

5. A means for attaching a camcorder to a telescope according to claim 4 wherein said angle is 90°.

6. A means for attaching a camcorder to a telescope according to claim 1 wherein said adjusting rail means comprises a mounting bracket, a rail for attaching said camcorder and an adjustment means for sliding said rail relative to said mounting bracket.

7. A means for attaching a camcorder to a telescope according to claim 6 wherein said adjustment means is a rack and pinion.

8. A kit for attaching a camcorder to a telescope comprising:
a) dovetail bar
b) a dovetail adaptor slidable on said dovetail bar hand having tapped holes therein;
c) an L-bracket having tapped holes matchable to the tapped holes in said dovetail adaptor and having a pattern of holes on another surface.
d) an adjustable rail having a mounting block with tapped holes, a rail and a rack and pionion drive to move said rail in said block; and
e) a flexible ring to couple the camcorder to an eyepiece on the telescope.

9. A kit according to claim 8 further comprising at least one offset adaptor.

10. A kit according to claim 8 wherein said dovetail adaptor, L bracket and adjustable mounting block are one piece.

* * * * *